Jan. 2, 1934.  J. H. RUSSELL  1,941,720
POTATO CUTTING MACHINE
Filed Dec. 12, 1931   2 Sheets-Sheet 2
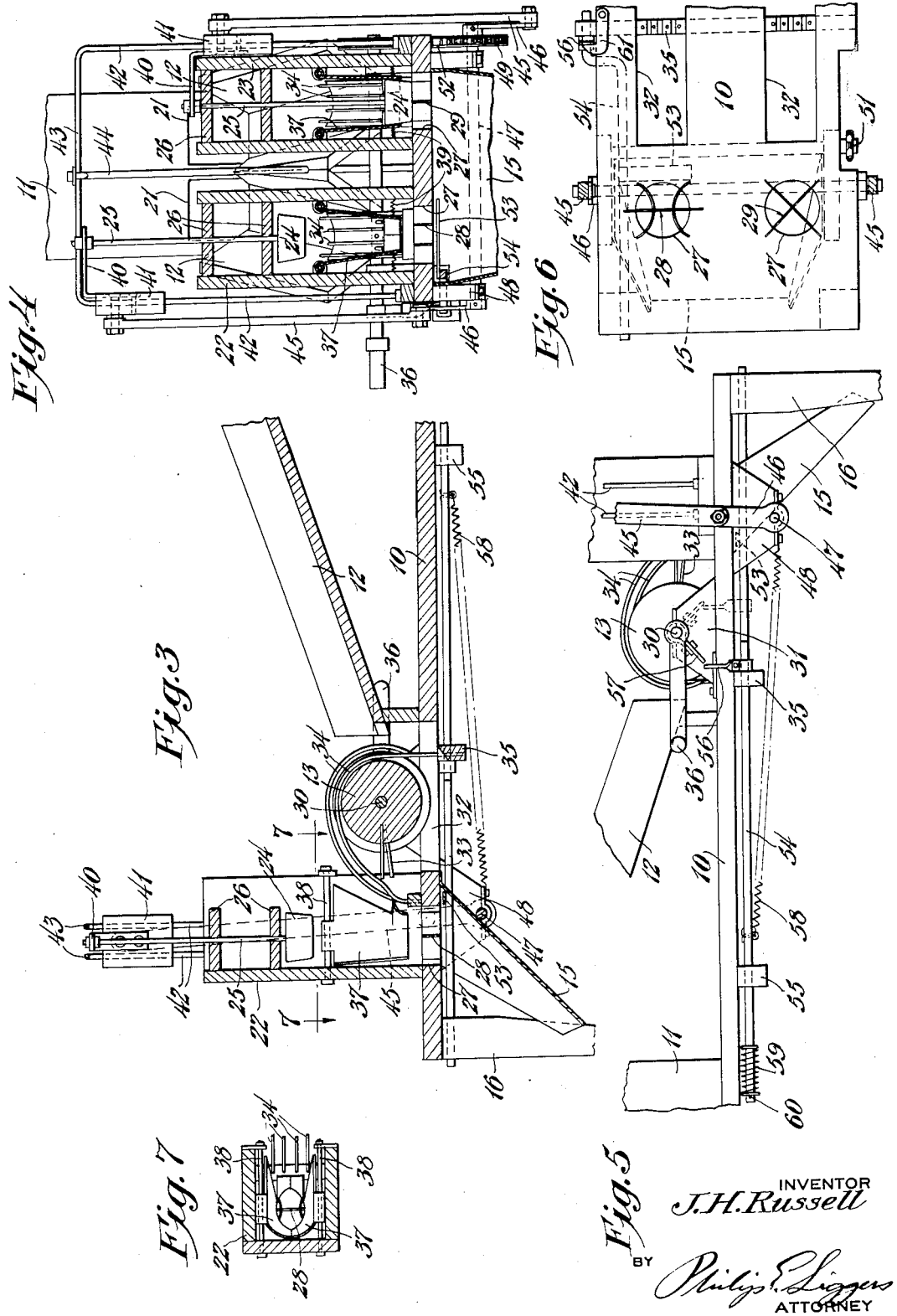
INVENTOR
J. H. Russell
BY
Philip E. Liggers
ATTORNEY Patented Jan. 2, 1934

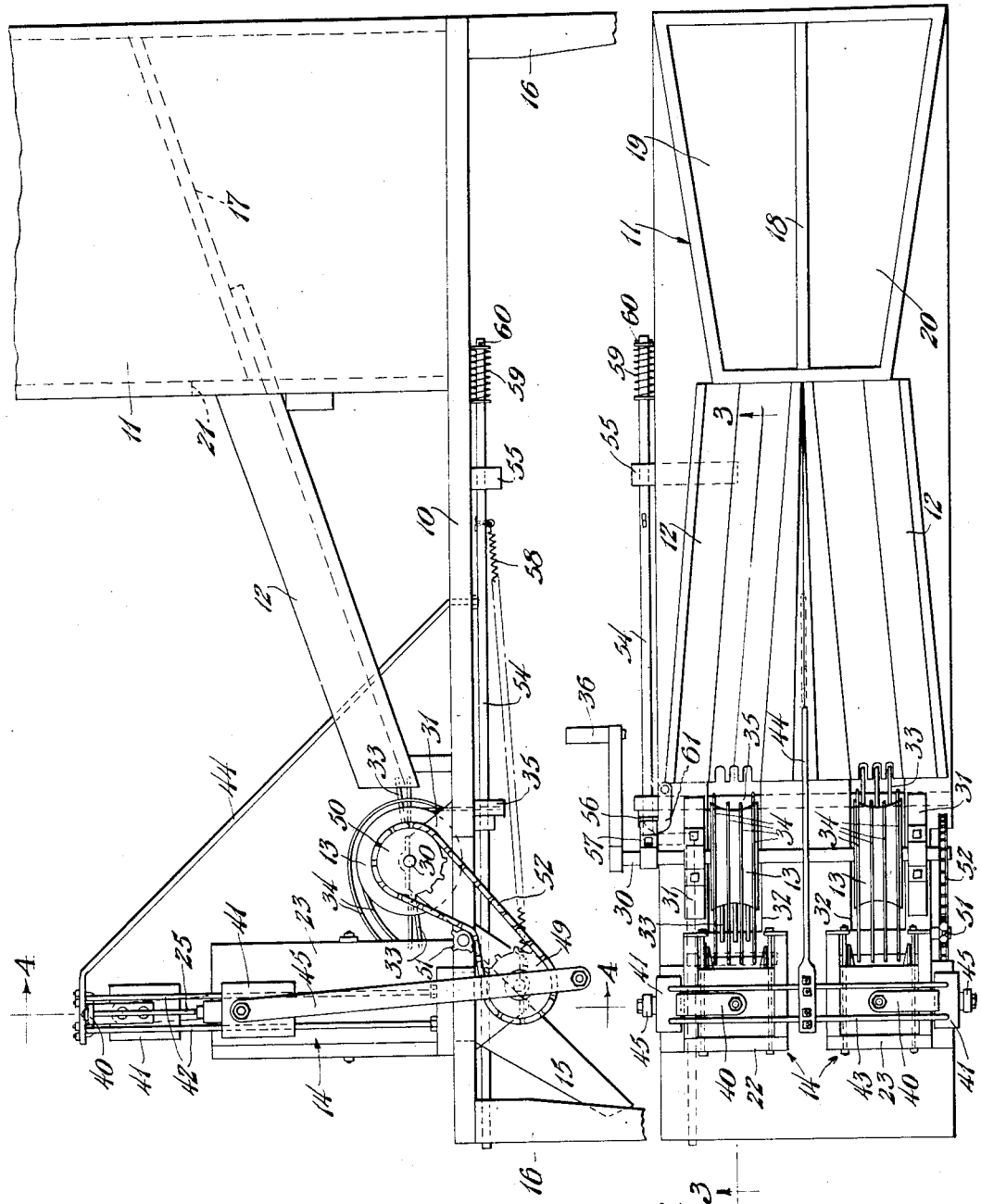

1,941,720

UNITED STATES PATENT OFFICE 1,941,720

POTATO CUTTING MACHINE

John H. Russell, Kimball, Nebr.

Application December 12, 1931
Serial No. 580,712

3 Claims. (Cl. 146—169)

This invention relates to potato cutting machines and, among other objects, aims to provide an improved machine for cutting seed potatoes of various sizes into pieces of substantially uniform size.

In the drawings showing the preferred embodiment of the invention:

Fig. 1 is a side elevation of the machine;

Fig. 2 is a top plan thereof;

Fig. 3 is a fragmentary vertical section taken on line 3—3 of Fig. 2;

Fig. 4 is a vertical sectional view taken on line 4—4 of Fig. 1;

Fig. 5 is a partial elevation of the machine showing the side opposite to that shown in Fig. 1;

Fig. 6 is a partial plan view of the front end of the machine bed; and

Fig. 7 is a sectional view taken on line 7—7 of Fig. 3.

Referring particularly to the drawings, the machine is there shown as comprising a bed 10 having a hopper 11 mounted at the rear end thereof from which the potatoes gravitate through chutes 12 to feeding wheels 13, which direct them to cutting means generally designated by the numeral 14. After the potatoes are cut they are discharged from the machine through a spout 15 to a suitable receptacle, not shown.

The bed 10 of the machine is preferably made of wood and has legs 16 for supporting it above the ground. The hopper has an inclined bottom 17 spaced above the bed of the machine and preferably has a vertical portion 18 to divide it into two compartments 19 and 20 each of which has an outlet 21 at its front end communicating with one of the chutes 12. The chutes also have inclined bottoms and their front ends terminate adjacent to the feeding wheels 13 and on a horizontal plane with the axis thereof.

The cutting mechanism is shown as comprising spaced compartments 22 and 23 having vertical front and side walls extending upwardly from the bed. The rear walls of the compartments are omitted so that the compartments may receive the potatoes from the feeding wheels. Mounted for vertical movement in each compartment is a compressor head 24, each head being connected to the lower end of a vertical plunger rod 25 which is slidably mounted in guide members 26. The heads are reciprocated alternately by mechanism to be later described. Directly beneath each head 24, an opening 27 is provided in the bed and vertical cutter knives 28 and 29 extend across the openings with their ends imbedded in the bed so that their upper edges, which are preferably sharpened, are substantially flush with the upper surface of the bed. The knives 28 are shown as comprising a strip of metal extending transversely of the bed and two other strips spaced from each other and crossing the transverse strip, thus dividing the opening into six smaller openings. As a potato is forced downwardly over the knives by the head 24, it is divided into six pieces, which fall into chute 15. The knives 29 are shown as two crossed strips of metal to divide the opening into four smaller openings and thereby cut a potato into four pieces.

The feed wheels 13 are arranged between the compartments 22, 23 and the lower ends of the chutes 12 and are secured on a transverse shaft 30 journaled above the bed in bearing blocks 31. An elongated opening 32 is cut in the bed beneath each wheel to provide clearance for the wheels and for feeding forks 33 secured to the wheels. The forks are shown as comprising spaced wires or tines each having one end secured in the wheel and the other end extending radially therefrom. The outer ends of the outside wires of each feeding fork preferably lie in a different plane from the middle wire, so that the forks will better conform to the shape of the potatoes. The lower front ends of the chute bottoms are notched, as shown, to provide clearance for the forks. The fork on one wheel is arranged diametrically opposite to the fork on the other wheel to feed the potatoes alternately to the compartments 22 and 23. To direct the potatoes into the cutting compartments, guide troughs are provided in the form of spaced wires 34 which extend over and downwardly in front and rear of the wheels. The front ends of the wires are secured to the bed adjacent to the rear edges of the openings 27 and the rear ends of the wires extend downwardly through the openings 32 and are secured to a cross bar 35 beneath the bed. Herein, there are shown four wires 34 for each wheel so that the tines of the fork 33 may pass between them. The outside wires 34 are spaced above the inside wires so as to form a trough. The periphery of each wheel 13 is concave as shown to provide clearance for the wires 34.

To operate the wheels a crank handle 36 is secured to one end of the shaft, or a pulley (not shown) may be provided so that the machine may be operated by power if desired. As the potatoes from the hopper reach the lower ends of the chutes, they rest on the chute bottoms and against the wires 34. As the wheels are rotated, the forks engage under the potatoes and lift them upwardly over the wheels, the potatoes being guided by the wires 34. After passing over the wheels the potatoes slide by gravity and momentum over the wires into the compartments.

To direct the potatoes over the centers of the cutters so that they will be cut uniformly, a pair of guide vanes 37 are provided in each compartment. Herein, they are shown as being formed of sheet metal and pivoted at their upper ends on rods 38. The vanes converge downwardly and their front edges are bent inwardly and abut each other as do the lower portions of the rear edges. The upper rear edges are bent outwardly so as to permit the potatoes to pass between them from the guide wires 34. The vanes in each compartment are held in abutting relation by springs 39 (Fig. 4) between the vanes and the side walls of the compartment. The opening at the bottom of the vanes is smaller than the opening 27, so that as each potato is fed, the vanes will open to the size of the potato and hold it centered on the knives.

To operate the heads 24, the upper end of each rod 25 is secured to an arm 40 which is secured to and extends inwardly from a cross-head 41. Each cross-head is slidably mounted on spaced guide members 42 secured to and extending upwardly from the bed 10 between the compartment and the side edge of the bed. The upper ends of the guide members 42 on one side of the machine are connected to those on the other side by cross members 43 and the guide members are held rigidly upright by a tie rod 44 connected to the cross members 43 and extending downward and rearwardly to the bed to which it is secured, as shown in Figs. 1 to 4. The cross-heads are each connected to the upper end of a pitman 45 whose lower end is connected to a crank 46 secured on a transverse shaft 47 journaled in suitable bearing blocks 48 beneath the bed 10. The shaft 47 is driven from shaft 30 by sprocket 49 on shaft 47, sprocket 50 on shaft 30, idler sprocket 51 and chain 52. As shown in Figs. 1 and 4 the cranks 45 are arranged diametrically opposite so that the heads 24 operate alternately and thereby balance the operation of the machine. The forks 33 on the wheel 13 are also diametrically opposed, as before stated, and the shafts 30 and 46 are synchronized so that when a potato is fed into compartment 22 the head in that compartment will be at the upper end of its stroke. At that time the head in the compartment 23 will be at the bottom of its stroke and the feed wheel for that compartment 23 will be engaging with a potato from the chute leading to compartment 23.

While the hopper 11 could be made with only one compartment and a single outlet to feed both chutes, it is desirable to provide the two compartments 19 and 20. With a single compartment the potatoes would have to be sorted as they emerge from the outlet and placed in their respective chutes. By providing two compartments the potatoes may be sorted first. The small potatoes may be placed in compartment 20 and the medium sized ones in compartment 19. The large potatoes are placed in a suitable receptacle to be later placed in compartment 19 and cut into twelve pieces, as will be described. The very small potatoes, which are planted whole and hence not cut in the machine, may be graded and left out or may be placed in either compartment as they will fall through the spaces between the lower ends of the chutes and the wires 34. The small and medium size potatoes will be fed alternately to the compartments 23 and 22, where they will be cut into four and six pieces respectively. As the heads 24 only descend to the tops of the knives it will be apparent that the potato pieces may remain on the knives until forced down by the next potato.

To cut a large potato into pieces of proper size, means are provided to cut them horizontally after they have been cut vertically by the knives 28. Herein, a knife blade 53 is secured at one end to bar 54 extending longitudinally of the bed at the side adjacent to compartment 22 and beneath the bed. The bar is slidably mounted in one of the front legs 16, in the cross-bar 35 and in a cleat 55. The front portion of the bar is offset, as shown, and extends through the rear portion of the spout 15. The knife 53 extends laterally of the bed and is adapted to be projected by power across the opening 27 to cut off the portion of the large potato extending below the knives 28. The upper portion of the potato remains on the knives 28 until pushed downwardly by the next potato. Thus, each large potato may be cut into twelve pieces.

To operate the knife 53, a lug 56 is secured to the bar 54 and extends upwardly adjacent to the shaft 30 and is adapted to be engaged by the end of a cam arm 57 secured on shaft 30, as shown in Fig. 5. The bar is held normally forward by a contractile coiled spring 58, secured at one end to the rear portion of the bar and at the other end to one of the bearing blocks 48. As the shaft 30 is rotated, the arm 57 engages the lug 56 and draws the bar and knife rearwardly until the arm is disengaged from the lug, at which time the knife is clear of the rear edge of the spring 27. The bar and knife are then jerked forwardly by the spring 58 to cut the potato. The cam arm 57 on shaft 30 is so arranged that the knife is released after the head 24 reaches the bottom of its stroke. To provide a stop for the bar as it returns to normal position and to absorb the shock, an expansible coiled spring 59 is mounted on the rear portion of bar 54 between cleat 55 and a pin 60 extending transversely through rear end of the bar. The spring is compressed between the pin and the cleat when the bar reaches the forward end of its stroke.

To hold the knife 53 inactive when medium sized potatoes are being cut, a latch 61 (Fig. 2) is pivoted on the bed and engages with the lug 56 to hold the bar rearwardly. When the large potatoes are to be cut they are placed in compartment 19 and the latch 61 is released to render the knife blade 53 operative.

From the foregoing description, it will be seen that a machine has been provided which may be constructed at little cost and which will effectively cut potatoes for seed. The feed wheels insure positive feeding of the potatoes to the cutters and the guide vanes center them properly on the knives. The operating mechanism is balanced, thereby insuring long life to the machine and obviating undue strain on the operator if hand-operated or on the motor drive if power-operated.

Obviously, the present invention is not restricted to the particular embodiment thereof herein shown and described. Moreover, it is not indispensable that all the features of the invention be used conjointly since they may be employed advantageously in various combinations and sub-combinations.

What I claim is:—

1. A potato cutting machine comprising, in combination, a bed having transversely spaced openings therethrough near the front ends; vertical cutting knives extending across the openings; a compartment extending upwardly around each opening, said compartments being open at their rear ends; a plunger rod slidably mounted for vertical reciprocation in each compartment; a head on the lower end of each plunger; means to reciprocate the plunger rods alternately to force potatoes downwardly over the knives; guide means in each compartment to position the potatoes centrally over the knives; a hopper; a chute leading from the hopper toward each compartment; means between the chutes and the compartments to feed potatoes into the guide means; a rotatable shaft for the feeding means; a horizontal rod slidably mounted beneath the bed at one side thereof; a transverse knife secured at one end to the rod and adapted to move longitudinally of the bed beneath one of the openings; spring means to normally hold the knife in front of the opening; a lug on the rod; cam means on the shaft engageable with the lug to move the rod rearwardly against spring tension and then release it; and manually operated means to render the knife inactive.

2. A potato cutting machine comprising, in combination, a bed having transversely spaced openings therethrough near the front ends; vertical cutting knives extending across the openings; a compartment extending upwardly around each opening, said compartments being open at their rear ends; a plunger rod slidably mounted for vertical reciprocation in each compartment; a head on the lower end of each plunger; means to reciprocate the plunger rods alternately to force potatoes downwardly over the knives; guide means in each compartment to position the potatoes centrally over the knives; a hopper; a chute leading from the hopper toward each compartment; a transverse shaft rotatably mounted between the ends of the chutes and the compartments; feeding wheels secured on the shaft; spaced wires extending over the wheels and having their front ends adjacent to the guide means; and forks projecting radially from the wheels and extending between the wires to engage potatoes at the ends of the chutes and convey them over the wires to the guide means.

3. A potato cutting machine comprising, in combination, a bed having transversely spaced openings therethrough near the front ends; vertical cutting knives extending across the openings; a compartment extending upwardly around each opening; said compartments being open at their rear ends; a plunger rod slidably mounted for vertical reciprocation in each compartment; a head on the lower end of each plunger; means to reciprocate the plunger rods alternately to force potatoes downwardly over the knives; guide means in each compartment to position the potatoes centrally over the knives; a hopper; a chute leading from the hopper toward each compartment; a transverse shaft rotatably mounted between the ends of the chutes and the compartments; feeding wheels secured on the shaft; spaced wires extending over the wheels and having their front ends adjacent to the guide means; forks projecting radially from the wheels and extending between the wires to engage potatoes at the ends of the chutes and convey them over the wires to the guide means; a knife slidably mounted beneath one of the openings and adapted to be projected across the opening in a horizontal plane; and means on the shaft to operate the knife.

JOHN H. RUSSELL.